July 9, 1940. W. KELLGREN 2,206,899
METHOD OF MAKING PRESSURE-SENSITIVE ADHESIVE SHEETS
Filed April 4, 1938
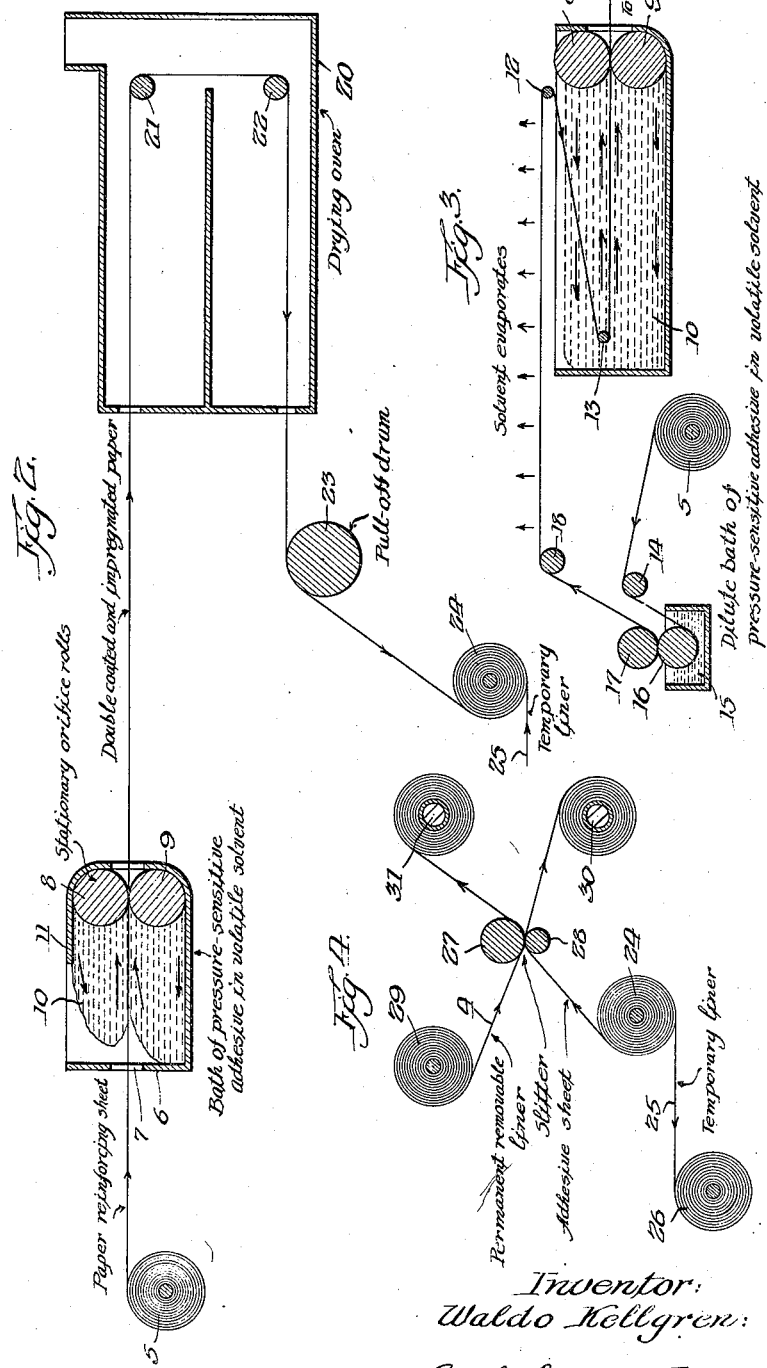
Inventor:
Waldo Kellgren:
By: Paul Carpenter
Atty.

Patented July 9, 1940

2,206,899

UNITED STATES PATENT OFFICE 2,206,899

METHOD OF MAKING PRESSURE-SENSITIVE ADHESIVE SHEETS

Waldo Kellgren, St. Paul, Minn., assignor to Minnesota Mining & Manufacturing Company, St. Paul, Minn., a corporation of Delaware Application April 4, 1938, Serial No. 199,944

6 Claims. (Cl. 91—68)

This invention relates to pressure-sensitive adhesive sheet material in the form of a thin flexible paper reinforcing sheet which is highly porous and is coated on both sides, and impregnated and unified, with normally tacky and pressure-sensitive adhesive, forming a permanently unitary flexible sheet which is proof against splitting or delamination when removed from surfaces to which temporarily applied.

This adhesive sheet may be conveniently rolled in tape form, or stacked in pieces of desired size, using a removable liner to prevent self adhesion. By supplying the adhesive sheet with a removable liner which is firmly pressed there-against, and subsequently rolling or stacking with use of a lesser pressing force, the sheet and attached liner may be readily unrolled or unstacked as a unit, and then applied to a surface with the back side protected by the liner, following which the liner may be stripped off leaving the adhesive sheet stuck to the surface.

Adhesive sheet material of this kind has many uses. Thus it provides a very convenient and efficient way of temporarily securing sheet material to various surfaces, as for example labels, notices, posters, shelf and drawer lining paper, etc. When such paper or other sheet material is to be removed it is only necessary to pull it free. Depending upon the nature of the attached sheet and of the base surface, the adhesive sheet will either adhere to the latter or to the removed sheet. If it adheres to the base surface, it may be readily grasped and pulled free.

An object of the invention is to provide a non-offsetting adhesive, so that the adhesive sheet may be removed from surfaces to which temporarily applied without offsetting of adhesive; to provide a reinforcing sheet which is tough and unified so that it will not split or easily tear when the adhesive sheet is being removed; and to provide an adhesive sheet in which the adhesive coating is so firmly united to the reinforcing sheet that it will not delaminate when the adhesive sheet is being removed. These characteristics enable the adhesive sheet to be readily removed by stripping off and without leaving an undesirable residuum or deposit of adhesive upon the surface. A further object is to provide an adhesive which permits the adhesive sheet to aggressively but removably adhere to a wide variety of surfaces—such as wood, glass, metal, lacquered or painted surfaces, films or sheets of "Cellophane" (regenerated cellulose) and cellulose-derivatives (as cellulose acetate and cellulose nitrate), etc.

The adhesive sheet may also be used for permanently joining sheeted or other material; and may be laminated to a permanent backing to provide an adhesive sheet which is adhesive on one side only, the double-coated reinforcing sheet then serving also as a reinforcement for said backing and the inner coating of adhesive serving to join the two together.

The adhesive is "normally tacky and pressure-sensitive," by which it is meant that under ordinary atmospheric conditions the adhesive is stably in a condition such that it does not need to be activated by solvents or otherwise prepared in order to secure good adherence to surfaces against which the adhesive tape may be pressed, to result in an aggressive adhesive bonding to the surface which resists separation therefrom except by a force greater than the pressure necessary to obtain adhesion. Furthermore, a "non-offsetting" adhesive layer is provided, meaning that the adhesive is possessed of such coherence in relation to adhesiveness and is so firmly united to the reinforcing sheet that the adhesive sheet or tape may be separated from surfaces not possessing special chemical affinity for the adhesive, to which it may have been temporarily applied, without offsetting of adhesive material. Hence the term "non-offsetting" designates an important physical or chemico-physical property or characteristic of the adhesive.

By a "unified" porous paper reinforcing sheet it is meant that the saturating composition (in this case the adhesive) binds or welds the fibres together so securely that the pull exerted by the adhesive coating, when the adhesive sheet is removed from surfaces to which temporarily applied, will not split or otherwise destroy the unity of the paper.

On the one hand the adhesive unifies and strengthens the paper reinforcing sheet, and on the other hand the reinforcing sheet makes for a strong tough adhesive sheet, so that each component aids the other. In accordance with the present invention, the reinforcing paper sheet is so porous that it may properly be regarded as lying within the body of adhesive material which coats and impregnates it, rather than as constituting a distinct lamina coated with adhesive which penetrates to a limited degree only, and this makes the adhesive sheet highly resistant to delamination and splitting.

The paper reinforcing sheet should be thin, flexible, of open texture so as to be highly porous, and should be tough and strong. I prefer to employ a thin sheet of long-fibred rope paper of open texture. Rope paper is made from hemp fibres and is quite tough and strong even when thin and open textured. Such paper is exemplified by "Troya tissue," made of purified Manila hemp fibres. The fibres range from ¼ to ½ inch in length and mostly run in a direction lengthwise of the web, which is advantageous in that when adhesive tapes are made with the fibres of the reinforcing sheet running lengthwise, there will be a greater lengthwise tensile strength and resistance to crosswise tear than would otherwise be possible. Paper of 2 mil thickness, for example, weighs 14 lbs. per ream (i. e., 480 sheets 24 in. by 36 in., or the equivalent, weighs 14 lbs.); and has a lengthwise tensile strength of 16½ lbs. per inch width and a crosswise tensile strength of 2 lbs. The high porosity is indicated by the fact that 10 thicknesses of 2 mil paper require only 5 seconds to pass 400 cc. of air through a 1⅛ in. diameter opening on the Gurley Densometer (original model, No. 4100). The high porosity may also be indicated by the statement that it is 5 to 25 times greater than that of absorbent paper towelling, comparing equal test thicknesses. This brings up the point that porosity and absorptiveness are not synonymous. Porosity is required in order that the impregnant may adequately penetrate between the fibres.

The Troya tissue may be used in thicknesses as low as 1 mil, but for present purposes a thickness of about 4 mils is preferred.

Another example of rope paper is "Dextilose," in which the fibres are also of hemp, but which differs in that the paper has substantially the same lengthwise and crosswise tensile strength and tear resistance. A further example is "Flexrope," a 100% rope paper made of reclaimed rope (and hence of hemp fibres).

The pressure-sensitive adhesive material may be of any kind satisfying the requirements heretofore indicated, including the ability to sufficiently saturate the paper sheet when dispersed in a liquid vehicle so that upon removal of the vehicle the content of impregnant solids will be adequate to unify the paper. It may contain a reinforcing pigment capable of penetrating into the paper, and may be colored by a pigment or dye. The following examples illustrate suitable adhesive compositions for coating and unifying the paper, all parts being by weight.

*Adhesive Example 1*

|  | Parts |
|---|---|
| Latex crepe | 100 |
| Zinc oxide | 100 |
| Rosin | 100 |
| Heptane (volatile solvent) | 400–600 |

The latex crepe and zinc oxide are milled on a rubber mill for 10 minutes, at a temperature of about 140–150° F., and the resulting base is cut into small pieces and placed in a suitable churn with the rosin and solvent. The mixture is mixed until homogeneous, involving mixing for about 40 hours.

*Adhesive Example 2*

|  | Parts |
|---|---|
| Latex crepe | 132 |
| Zinc oxide | 165 |
| Blue pigment mixture | 39.5 |
| No. 10 wood rosin | 72.5 |
| "Flectol B" (antioxidant) | 1.5 |
| Heptane (volatile solvent) | 750 |

The blue pigment mixture is exemplified by "Du Pont rubber blue Y D," a milled mixture of equal parts latex crepe and dry blue pigment. This may be omitted.

The latex crepe, zinc oxide and pigment are milled for 10 minutes, at a temperature of about 140–150° F., and the resulting base is cut into small pieces and churned with the antioxidant, rosin and solvent for about 40 hours at a temperature of 70–100° F.

The indicated heptane may be substituted for by another volatile rubber solvent such as benzol or naphtha. It will be understood that the proportion of solvent may be varied to produce the desired viscosity of the adhesive solution, which should be sufficiently low to insure thorough saturation of the paper and yet high enough to introduce sufficient solids so as to properly unify the paper. The adhesive solution produced according to these examples is a thick viscid liquid. The amount of hydrocarbon solvent required may be reduced by incorporating alcohol as a viscosity-reducer, which may be denatured ethyl alcohol (for example containing 5 volumes of methyl alcohol or ethyl acetate per 100 volumes of 190 proof ethyl alcohol) or may be methyl alcohol, and which may be used in amount equal to 10 to 20% of the hydrocarbon solvent.

The "Flectol B" (a liquid condensation product of acetone and aniline) is used as an antioxidant to improve the rubber aging qualities. Other suitable antioxidants or age-resisters are: "Flectol H" (a solid condensation product of acetone and aniline), "Solux" (p-hydroxy-N-phenylmorpholine), "Agerite Resin" (aldol-alpha-naphthylamine reaction product), "Antox", beta-naphthol, "Agerite Alba" and "Agerite White." Those which are soluble in the rubber solvent may be added directly, otherwise they may be milled into the rubber during the initial milling.

The coloring pigment serves also as a reinforcing pigment, as does the zinc oxide, giving greater cohesiveness (firmness) to the adhesive. These pigments may be omitted or reduced in order to produce transparent adhesive coatings and a transparent or semi-transparent adhesive sheet product. The adhesive impregnant with which the paper is saturated serves to transparentize it.

*Adhesive Example 3*

|  | Parts |
|---|---|
| Isobutylene polymer "medium" | 200 |
| Isobutylene polymer "low" | 200 |
| Soft cumarone resin | 80 |
| Heptane | 1600 |

The isobutylene polymers are resinous materials, the one designated "medium" having a molecular weight of about 80,000 and is transparent and "rubbery" in appearance. The one designated "low" has a molecular weight of about 14,000. The ingredients are placed in a churn and mixed until homogeneous.

The cumarone resin acts as a tack-producer, as does the lower isobutylene polymer. The latter may be omitted and the stated proportion of cumarone resin retained or increased, and the cumarone resin may be substituted for by wood rosin or other tack-producing resin.

This composition forms particularly clear and transparent pressure-sensitive adhesive coatings and is quite effective in transparentizing the paper reinforcing sheet. However, a coloring pigment may be incorporated in producing colored adhesive tape, as illustrated by the following:

*Adhesive Example 4*

|  | Parts |
|---|---|
| Isobutylene polymer "medium" | 1 |
| Zinc oxide | 0.5 |
| Para-toluidine red | 0.2 |
| Wood rosin | 0.5 |
| Hydrogenated methyl abietate | 0.2 |
| Heptane | 7 |

The isobutylene polymer, zinc oxide and coloring ingredient (illustrated by para-toluidine red)

are first milled on a rubber mill until a uniform plastic composition is secured. This plastic mass is then cut into pieces and placed in a suitable churn with the balance of the ingredients and churned until a homogeneous solution is formed. The wood rosin serves as a tack-producing agent, so that normally tacky and pressure-sensitive adhesive coatings will be formed. The hydrogenated methyl abietate serves as a plasticizer and may be omitted.

In the accompanying drawing:

Fig. 1 is a diagrammatic magnified section of an adhesive sheet attached to a removable liner, showing the constituent parts;

Fig. 2 is a diagrammatic representation showing a continuous method of making such adhesive sheeting;

Fig. 3 shows an alternative method of impregnating and coating the paper reinforcing sheet; and Fig. 4 shows diagrammatically a method of forming the manufactured adhesive sheet into rolls of adhesive tape.

Referring to Fig. 1, there is shown the combination of a flexible porous paper reinforcing sheet 1 impregnated and coated on both sides with normally tacky and pressure-sensitive adhesive, the latter providing adhesive coatings 2 and 3. By way of illustration, the paper sheet may be Troya tissue of 4 mil thickness and the adhesive coatings may have a thickness of approximately 1 mil each, making for a total adhesive sheet thickness of approximately 6 mils (0.006 in.). It is preferred that the total thickness be not over approximately 8 mils (as for example when paper of 6 mil thickness is used), as ample strength and toughness will be present and such limited thickness makes for great flexibility and lack of bulging when used for securing paper sheets to surfaces. The adhesive sheet is shown attached to removable liner 4, which may suitably be crinoline (starched cheesecloth).

Referring to Fig. 2, which shows an illustrative method of making and means for carrying out the method, the reinforcing paper is drawn as a web from supply roll 5 and passes more or less horizontally to and through tank 6, where it is impregnated and double-coated, passing through horizontal slot 7 in the rear wall of the tank and out between stationary rolls 8 and 9 which constitute the front end of the tank and are spaced to provide an exit orifice of the desired width. The tank holds the impregnating and coating bath 10 of adhesive in a volatile solvent, examples of which have been given. This is ordinarily highly viscous or viscid, and sticky, and is drawn forward by the moving paper web, so that there is provided an apron 11 running back from the top of upper roll 8 to prevent the adhesive solution from overflowing. Owing to the stiffness of the solution, it does not run back to the entrance slot, but is drawn forwardly on either side of the moving paper web and then backwardly at the top and bottom, the circulation being indicated by the arrows in Fig. 1. The moving paper web causes adhesive solution to be drawn and forced toward the exit orifice formed by the rolls, and the solution above and below the paper thus exerts a wedging action on the paper from both sides which, due to the viscidity of the solution, holds the paper web evenly spaced from the rolls as it passes therebetween. A further advantage resulting from this effect is that guide means are not required for the purposes of directing the paper to and from the orifice in a single plane, and the web may approach and leave the orifice without being flat. Thus an even coating of the paper is assured in a simple foolproof manner. In order to obtain best results, each roll should have a diameter of not less than about 6 inches, and I have found that an 8 inch diameter is very satisfactory. A greater diameter may be used, but it should not be so great as to develop a degree of friction which will cause the paper to break. This expedient has been described in some detail because it represents a valuable solution of a very difficult problem. It is not a simple matter to uniformly double-coat a thin paper sheet with a viscid sticky composition, particularly when a good speed is desired. Using this expedient I have found that a coating speed of 5 to 12 yards per minute can easily be obtained under commercial operating conditions.

The orifice-forming elements need not of course be in the form of cylindrical rolls, so long as equivalent curved surfaces are provided, and such equivalents are to be understood as included within the scope of the claims.

A further advantage of this type of orifice is that it forces the adhesive solution against and into the paper, thus making for a more uniform and thorough impregnation.

The orifice rolls are of course spaced apart by a distance which will result in the desired coating thickness, a matter that can be readily determined by trial.

Referring now to Fig. 2, an alternative or modified coating arrangement is shown in the right-hand part thereof. Here the paper web moves forwardly above the bath 10, over and back under roller 12 to fixed roll or rod 13, which is located within the rear part of the bath and with its lower extremity parallel to and opposite the exit orifice, over and under roll 13 and thence forwardly to and through the orifice provided by orifice rolls 8 and 9. By this arrangement the paper moves rearwardly through the upper part of the bath and causes the adhesive solution to be carried back without tending to overflow roll 8, and drags adhesive solution from the upper to the lower part of the bath so that the latter will be amply supplied. This arrangement may be used where the paper web passes directly from the supply roll into the bath.

However, the paper may be presaturated, as illustrated by the left-hand part of Fig. 2. Here, the paper web from supply roll 5 passes rearwardly over roller 14; thence downwardly at an angle into treating bath 15 of dilute pressure-sensitive adhesive solution, so that both sides will be covered with solution; passes under roller 16, which dips into the solution, and thence back up between roller 16 and overlying roller 17 which are spaced so as to squeeze excess of solution from the surfaces of the paper; thence up over roller 18 and forwardly to roller 12, from which it passes into bath 10, previously described. In moving from roller 18 to roller 12, the volatile solvent is permitted to evaporate, and this may be facilitated by the provision of heating means if desired. This presaturation with a more dilute solution aids in securing thorough penetration of the adhesive solids into the middle interior of the paper, and is of value in dealing with paper of greater thickness and density than can be easily unified by impregnation in the more concentrated solution alone. The bath may be comprised of the concentrated solution, as illustrated in the examples previously given, thinned by adding a greater amount of solvent. Thus in Example 2, the ratio of solvent to rubber, by weight, is about 5 to 1, and this may be increased to 15-30 to 1 for the presaturation bath.

Referring again to Fig. 1, the wet, impregnated and double-coated paper web passes from orifice rolls 8 and 9 to and through drying oven 20, for solvent removal, moving horizontally forward through an upper duct maintained at a temperature of about 150-160° F., until substantially dry, then down over rollers 21 and 22 and back through a lower drying duct maintained at a temperature of about 140-150° F., to complete the drying, and thence out of the oven and down over pull-off drum 23, which may have a diameter of 12 in. and may be cooled if desired by circulation of water through the interior. While "dry," the web is tacky and pressure-sensitive and adheres to the drum, but leaves the drum without depositing adhesive, owing to the high cohesiveness of the adhesive coating. This drum is driven and pulls the web from the supply roll and through the entire intervening distance without the need of interposed driving means.

The resultant finished adhesive sheet web may then be wound into roll 24, a temporary liner 25 being wound in to prevent the turns from sticking together.

Fig. 4 shows the making up of rolls of adhesive tape from the web of adhesive sheeting, ready for sale and use. The temporary roll 24 is unwound by winding off the temporary liner 25 into roll 26, which is driven. The ejected adhesive sheet is drawn to and between driven score roll 27 and a gang of suitably spaced rotatable circular cutting knives 28 which slit the adhesive web into tapes of desired width. A permanent removable liner 4 (see Fig. 1) is drawn from supply roll 29 and passes between the adhesive web and score roll 27, where it is caused to adhere to the contacting surface of the adhesive web and is simultaneously slitted. The resultant adhesive tapes and their liners pass alternately to gangs of wind-up cores removably mounted upon driven rolls 30 and 31, where they are wound into rolls of desired length.

What I claim is as follows:

1. The method of making a pressure-sensitive adhesive sheet which comprises continuously passing a thin flexible strong paper web of high initial porosity through a viscid solution of normally tacky and pressure-sensitive adhesive in a volatile solvent, which solution is capable of saturating and unifying the paper, and drawing the paper between a pair of spaced-apart stationary cylindrical surfaces having a radius of curvature of the order of 4 inches, exposed to the solution and forming an exit orifice somewhat wider than the thickness of the paper, so that the solution wedges the paper midway between the surfaces and the paper is evenly coated on both sides, and drying the resultant saturated and coated paper to form a unified double-coated adhesive sheet.

2. In a process of making a pressure-sensitive adhesive sheet, the steps of continuously passing a thin paper web through a viscid solution of normally tacky and pressure-sensitive adhesive in a volatile solvent, and drawing the paper between a pair of spaced-apart stationary cylindrical surfaces having a radius of curvature of the order of 4 inches exposed to the solution and forming an orifice somewhat wider than the thickness of the paper, so that the solution wedges the paper midway between the surfaces and the paper is evenly coated on both sides, and drying the resultant double-coated paper.

3. In a process of making a pressure-sensitive adhesive sheet, the steps of continuously passing a thin paper web through a viscid solution of normally tacky and pressure-sensitive adhesive in a volatile solvent, and drawing the paper between a pair of spaced-apart stationary cylindrical surfaces having a radius of curvature of the order of 4 inches, exposed to the solution and forming an exit orifice somewhat wider than the thickness of the paper, so that the solution wedges the paper midway between the surfaces and the paper is evenly coated on both sides, and drying the resultant double-coated paper.

4. The method of double-coating a web of rope paper, having a thickness of not over about .4 mils, with a viscid solution of normally tacky and pressure-sensitive adhesive in a volatile solvent, which comprises continuously passing the paper through a bath of said solution and drawing it between a pair of spaced-apart stationary cylindrical surfaces having a radius of curvature of the order of 4 inches, exposed to the solution and forming an orifice somewhat wider than the thickness of the paper, so that the solution wedges the paper midway between the surfaces and the paper is evenly coated on both sides.

5. In a process of making a pressure-sensitive adhesive sheet, the steps of continuously passing a thin paper web through a viscid mass of normally tacky and pressure-sensitive adhesive, and then drawing the paper at a speed of at least about 5 yards per minute between a pair of spaced-apart stationary cylindrical surfaces having a radius of curvature of the order of 4 inches, exposed to the adhesive mass and forming an orifice somewhat wider than the thickness of the paper, so that the viscid adhesive mass coacts with said surfaces to wedge the paper midway therebetween and the paper is evenly coated on both sides with adhesive as it is drawn between said surfaces.

6. The method of making a pressure-sensitive adhesive sheet which comprises continuously impregnating a thin paper web of high initial porosity with a dilute solution of a unifying agent in a volatile solvent so as to secure a thorough penetration throughout the body of the paper and a partial saturation with the unifying agent, evaporating the solvent, passing the partially saturated paper web through a viscid solution of a normally tacky and pressure-sensitive adhesive in a volatile solvent, and then drawing the paper between a pair of spaced-apart stationary cylindrical surfaces having a radius of curvature of the order of 4 inches, exposed to the solution and forming an orifice somewhat wider than the thickness of the paper, so that the solution wedges the paper midway between the surfaces and the paper is evenly coated on both sides, and drying the resultant double-coated paper.

WALDO KELLGREN.